United States Patent
Soerensen

(10) Patent No.: US 11,043,867 B2
(45) Date of Patent: Jun. 22, 2021

(54) COOLING OF THE END-WINDINGS OF AN ELECTRIC GENERATOR

(71) Applicant: Siemens Gamesa Renewable Energy A/S, Brande (DK)

(72) Inventor: Peter Hessellund Soerensen, Brædstrup (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/280,166

(22) Filed: Feb. 20, 2019

(65) Prior Publication Data

US 2019/0280546 A1    Sep. 12, 2019

(30) Foreign Application Priority Data

Mar. 8, 2018 (EP) .................................... 18160698

(51) Int. Cl.
| | |
|---|---|
| *H02K 3/24* | (2006.01) |
| *F03D 9/25* | (2016.01) |
| *H02K 7/18* | (2006.01) |
| *H02K 9/06* | (2006.01) |
| *H02K 21/22* | (2006.01) |

(52) U.S. Cl.
CPC ............. *H02K 3/24* (2013.01); *F03D 9/25* (2016.05); *H02K 7/1838* (2013.01); *F05B 2260/404* (2013.01); *H02K 9/06* (2013.01); *H02K 21/22* (2013.01)

(58) Field of Classification Search
CPC ........... H02K 3/24; H02K 7/1838; F03D 9/25
See application file for complete search history.

(56) References Cited

U.S. PATENT DOCUMENTS

| | | | | |
|---|---|---|---|---|
| 3,106,654 A | * | 10/1963 | Wesolowski | ........... H02K 9/005 310/61 |
| 6,392,320 B1 | * | 5/2002 | Glahn | ...................... H02K 9/18 310/52 |

(Continued)

FOREIGN PATENT DOCUMENTS

| | | |
|---|---|---|
| CN | 204858875 U | 12/2015 |
| EP | 1006644 A2 | 6/2000 |

(Continued)

OTHER PUBLICATIONS

European Search Report for Application No. 18160698.9, dated Aug. 13, 2018.

(Continued)

*Primary Examiner* — Viet P Nguyen
(74) *Attorney, Agent, or Firm* — Schmeiser, Olsen & Watts LLP

(57) ABSTRACT

Provided is an electrical generator including a stator having a stator body extending axially between a first axial end and a second axial end, the stator body including a plurality of slots, the plurality of slots being circumferentially distributed around a longitudinal axis of the stator body. The stator includes a plurality of windings housed in the plurality of slots and a plurality of end-windings, each end winding having a curved shape and connecting the windings in two slots of the plurality of slots.
The electrical generator further includes at least one air guide inside and/or outside the plurality of end-windings cool.

11 Claims, 2 Drawing Sheets

(56) References Cited

U.S. PATENT DOCUMENTS

| | | | |
|---|---|---|---|
| 10,148,154 B2 | 12/2018 | Arlaban Gabeiras et al. | |
| 2002/0070615 A1* | 6/2002 | Jakoby | H02K 9/10 310/58 |
| 2014/0346778 A1* | 11/2014 | Arlab N Gabeiras | H02K 9/19 290/55 |

FOREIGN PATENT DOCUMENTS

| | | | |
|---|---|---|---|
| EP | 1182764 A1 | 2/2002 |
| EP | 2806537 A2 | 11/2014 |
| JP | S5875466 U | 5/1983 |

OTHER PUBLICATIONS

Non-english Chinese Office Action for Application No. 201910175827.9, dated Sep. 3, 2020.

* cited by examiner

COOLING OF THE END-WINDINGS OF AN ELECTRIC GENERATOR

CROSS-REFERENCE TO RELATED APPLICATIONS

This application claims priority to EP Application No. 18160698.9, having a filing date of Mar. 8, 2018, the entire contents of which are hereby incorporated by reference.

FIELD OF TECHNOLOGY

The following relates to an electric generator having provisions for cooling the end-windings of the stator.

The following may be particularly, but not exclusively, applied to the electric generator of a wind turbine.

BACKGROUND

An electric generator or motor, such as an electric generator installed in a wind turbine, typically comprises a rotor which rotates relative to a stator.

In a permanent-magnet electric generator installed in a wind turbine rotor the rotor comprises a plurality of permanent magnets.

The stator typically includes a body having stator slots extending along an axial direction of the stator and an electric circuit comprising a plurality of copper coils housed in the slots. The windings comprise end-windings axially protruding from the axial ends of the stator body. Each end-winding is normally shaped as a curve of copper wire in air connecting the wires in two respective stator slots.

The windings of the above described electric generator or motor may be classified as concentrated or distributed.

In a concentrated winding scheme turns are wound together in series to form one multi-turn coil, which is housed in two adjacent slots. In a distributed winding scheme all the winding turns are arranged in several coils and each coil is housed in different slots, which are not adjacent to each other.

Depending on the number of slots, the windings of the above described electric generator or motor may be classified as integral-slot or fractional-slot. If the number of slots per pole per phase is an integer, then the winding is called an integral-slot winding. If the number of slots per pole per phase is not an integer, than the winding is called a fractional-slot winding.

Combinations of the above two types of classification are possible, for example integral-slot concentrated windings (ISCWs) and fractional-slot concentrated windings (FSCWs) are both known.

Typically, in all the above described types of electric generators, the end-windings are the portions of the coil windings, which reach the highest temperatures. A proper cooling of the end-windings has therefore to be provided.

Until now this cooling problem has been solved by providing a flow of air between the stator and the rotor of the generator, which reaches also the end-windings. Such solution is not yet optimized, because the velocity of such air flow is not yet optimally controlled.

SUMMARY

Scope of embodiments of the present invention is to provide an optimized or improved cooling for the end windings of an electrical generator, which may be used for controlling the velocity of the air flow that reaches the end-windings, thus optimizing or improving the amount of heat removed from the end-windings.

According to a first aspect of embodiments of the invention, it is provided an electrical generator comprising a stator having a stator body extending axially between a first axial end and a second axial end, the stator body including a plurality of slots, the plurality of slots being circumferentially distributed around a longitudinal axis of the stator body, the stator including a plurality of windings housed in the plurality of slots and a plurality of end-windings, each end winding having a curved shape and connecting the windings in two slots of said plurality of slots, wherein the electrical generator further comprises at least one air guide inside and/or out-side the plurality of end-windings.

In the context of embodiments of the present invention "inside" and "outside" is referred to the curves shape of the end-windings. In other words, the "inside" of an end-winding is the volume of air comprised between the end-winding and the stator, while the "out-side" of an end-winding is the volume of air extending outwardly from the end-winding.

With "outwardly" it is meant a direction oriented from the stator, in particular along the rotational axis of the rotor of the electric generator.

Advantageously, adding air guides improves or optimizes the cooling of the end-windings. Two types of air guides may be used to force the air velocity up in speed on both the inside and the outside of the coil end-windings. The dimensions of the guides can be changed to achieve the optimal air speed for cooling the end-windings.

According to embodiments of the invention, at least one inner air guide is provided on one inside of at least one respective end-winding, the at least one inner air guide protruding from the stator body of the stator, an inner distance being provided between the at least one inner air guide and the respective end-winding. In particular, the at least one inner air guide may protrude from the stator body of the stator along the longitudinal axis.

The inner distance may be calculated in order to reach an optimal balance between the of the air flow between the inner air guide and the end-windings and the pressure drop. The air velocity, which has to be as high as possible for maximizing the cooling effect, is inversely proportional to the inner distance between the inner air guides and the end-windings, but so is also the pressure drop.

According to an embodiment of the present invention, one respective inner air guide is provided for each end-winding. In particular the end-windings may be concentrated end-windings.

According to embodiments of the invention, the at least one outer air guide is provided on one outside of the end-windings, an outer distance being provided between the at least one outer air guide and the end-windings.

Similarly as for the inner distance, also the outer distance may be calculated in order to reach an optimal balance between the air flow between the outer air guide and the end-windings and the pressure drop.

According to embodiments of the invention, the at least one outer air guide is fixed to a rotor of the electric generator, in particular to the brake disc of the rotor.

According to other embodiments of the invention, the at least one outer air guide is fixed to the stator of the electric generator.

At each of the first axial end or the second axial end of the stator, one single outer air guide may be provided for all the end-windings protruding from the stator at such axial end.

Embodiments of this invention can be efficiently adapted to an electric generator of a wind turbine.

By reducing the end-windings temperature, embodiments of the present invention allows an increase in the Annual Energy Production (AEP) of a wind turbine.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention is not limited.

BRIEF DESCRIPTION

Some of the embodiments will be described in detail, with reference to the following figures, wherein like designations denote like members, wherein.

DETAILED DESCRIPTION

Figure 1:
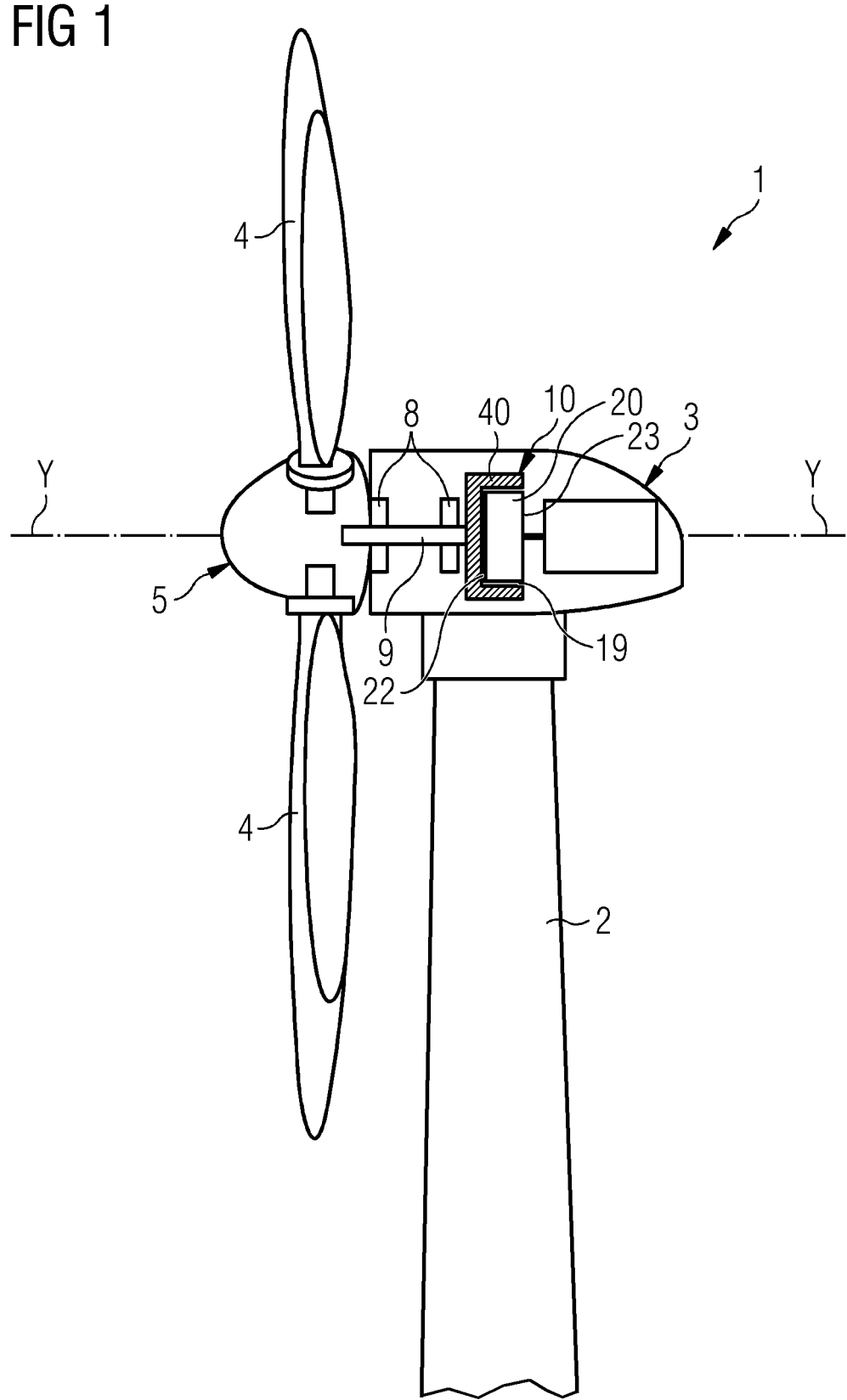
FIG. 1 shows a schematic section of a wind turbine including an electric generator according to embodiments of the present invention.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted fundament. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y.

The blades 4 extend radially with respect to the rotational axis Y.

The wind turbine 1 comprises a permanent magnet electric generator 10.

According to other possible embodiments of the present invention (not represented in the attached figures), embodiments of the present invention may be applied to other types of electric machines design, e.g. induction, synchronous, etc.

Embodiments of the present invention may be applied to both integral-slot and fractional-slot electric generators.

The wind rotor 5 is rotationally coupled with the permanent magnet generator 10 by means of a rotatable main shaft 9.

According to other possible embodiments of the present invention (not represented in the attached figures), the wind rotor 5 is rotationally coupled directly with the permanent magnet generator 10 (direct-drive generator configuration).

A schematically depicted bearing assembly 8 is provided in order to hold in place the rotor 5. The rotatable main shaft 9 extends along the rotational axis Y. The permanent magnet electric generator 10 includes a stator 20 and a rotor 40. The rotor 40 is rotatable with respect to the stator 11 about the rotational axis Y.

The rotor 40 is radially external with respect the stator 20 and rotatable about the rotational axis Y.

According to other possible embodiments of the present invention (not represented in the attached figures), the rotor 40 is radially internal with respect the stator 20 and rotatable about the rotational axis Y.

A circumferential air gap 19 is provided between the stator 20 and the rotor 40.

Figure 2:
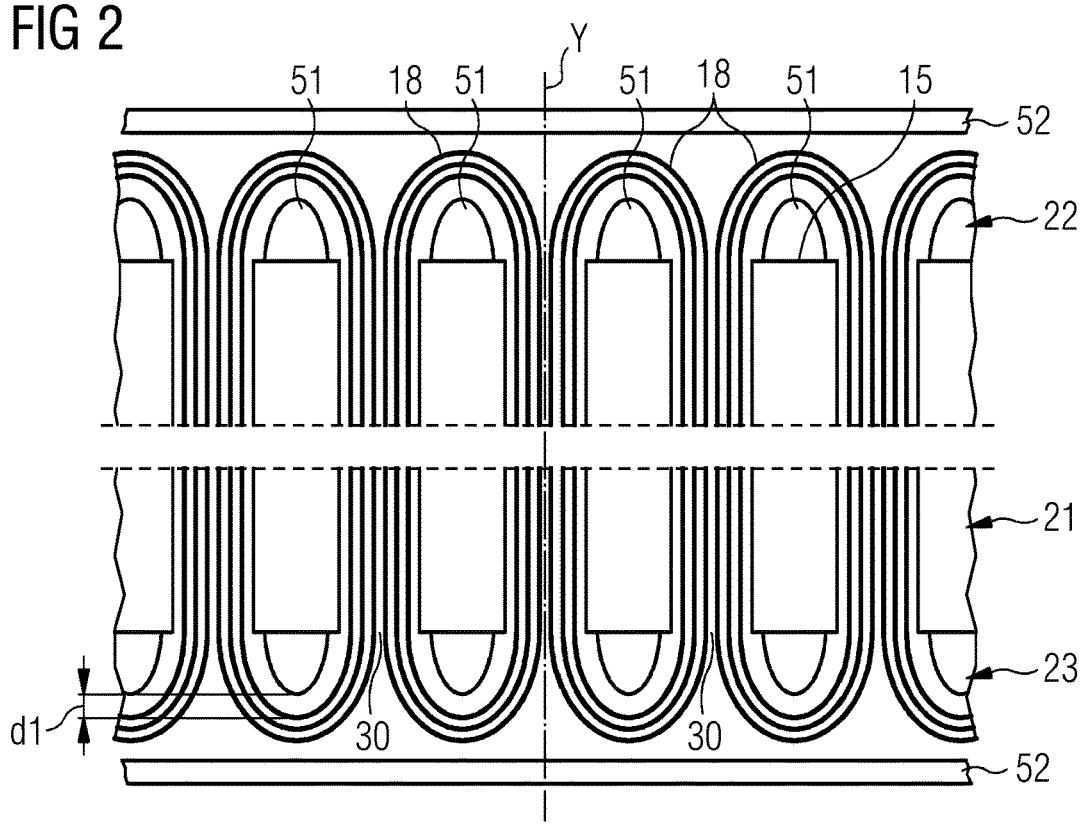
FIG. 2 shows a circumferential section of an electric generator according to embodiments of the present invention.

FIG. 2 shows a circumferential view of the stator 20. FIG. 2 shows the stator 20 according to a radial direction oriented from the rotor 40 towards the the rotational axis Y.

The stator 20 includes a stator body 21 having a plurality of radial stator teeth 15 and a plurality of intermediate slots 30, each slot 30 circumferentially extending between two respective teeth 15.

The stator 20 has a stator body 21 extending axially between a first axial end 22 and a second axial end 23.

The stator 20 including a plurality of windings 17 housed in the plurality of slots 30 and a plurality of end-windings 18, each end winding 18 having a curved shape and connecting the windings 17 in two slots 30 of said plurality of slots 30.

In the embodiment of the present invention represented in FIG. 2, a concentrated windings scheme is represented, where each end-winding 18 connects the axial ends of two concentrated windings 17 in two respective circumferentially adjacent slots 30.

In other embodiments of the present invention (not represented) a distributed windings scheme may be used.

According to embodiments of the present invention the electrical generator 10 further comprises at least one air guide 51, 52 inside and/or outside the plurality of end-windings 18.

In the embodiment of the present invention represented in FIG. 2, air guides 51, 52 both inside and outside the plurality of end-windings 18 are shown. In particular, in such embodiment the electrical generator 10 comprises a plurality of inner air guides 51 inside the end-windings 18 and two outer air guides 52, respectively at the first axial end 22 and at the second axial end 23, outside the end-windings 18.

In other embodiments of the present invention (not represented), only the inner air guides 51 or only the outer air guides 52 may be present.

Each of the inner air guides 51 protrudes from the stator body 21 of the stator 20. In particular, each of the inner air guides 51 may protrude from a respective tooth 15. In particular, each of the inner air guides 51 may protrude along the longitudinal axis Y.

Between each inner air guide 51 and the respective end-winding 18 an inner distance d1 is provided.

The inner distance d1 may be calculated in order to reach an optimal balance between the of the air flow between the inner air guide and the end-windings and the pressure drop. The air velocity, which has to be as high as possible for maximizing the cooling effect, is inversely proportional to the inner distance d1. Therefore low values of the inner distance d1 are desirable. However also the pressure drop inversely proportional to the inner distance d1 and consequently an optimal compromise has to be reached between a sufficient level of heat removal from the end-windings and a not acceptable increase in the pressure drop.

Figure 3:
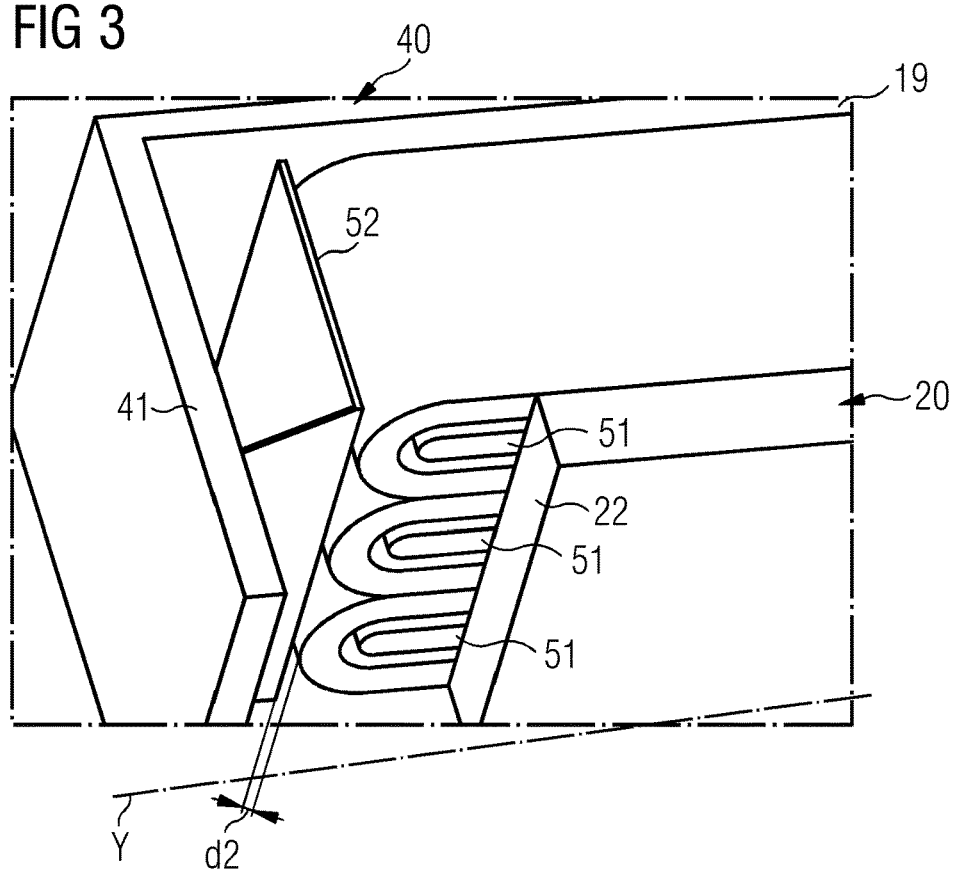
FIG. 3 shows a partial cross section of a first embodiment of an electric generator in accordance with embodiments of the present invention.

FIG. 3 shows a a partial cross section of the first axial end 22 of the stator 20 and of the rotor 40.

At the first axial end 22, an outer air guide 52 is provided on one outside of the end-windings 18. A similar outer air guide 52 may be provided also at the second axial end 23 (not represented in FIG. 3). Between the at least one outer air guide 52 and the end-windings 18 an outer distance d2 is provided.

Similarly to the inner distance d1, the outer distance d2 may be calculated in order to reach an optimal balance between the of the air flow between the outer air guide and the end-windings and the pressure drop. The air velocity, which has to be as high as possible for maximizing the cooling effect, is also inversely proportional to the outer distance d2. Therefore low values of the inner distance d2 are also desirable. An optimal compromise with pressure drop has to be reached.

According to the embodiment of FIG. 3, the outer air guide 52 is fixed to a rotor 40 of the electric generator 10. In particular, according to possible embodiments of the present invention (FIG. 2), the outer air guide 52 is fixed to the brake disc 41.

In other embodiments of the present invention (not represented), the outer air guide 52 is fixed to the stator 20 of the electric generator 10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electrical generator comprising:
a stator having a stator body extending axially between a first axial end and a second axial end, the stator body including a plurality of slots, the plurality of slots being circumferentially distributed around a longitudinal axis of the stator body,
the stator including a plurality of windings housed in the plurality of slots and a plurality of end-windings, each end-winding having a curved shape and connecting the windings in two slots of said plurality of slots, and
at least one inner air guide located at an inside of at least one end-winding of the plurality of end-windings, the inside of the at least one end-winding being a volume between the at least one end-winding and the stator,
wherein the at least one inner air guide protrudes from the stator body of the stator along the longitudinal axis,
wherein an inner distance is provided between a distal end of the at least one inner air guide in the direction of the longitudinal axis and the respective end-winding, the inner distance allowing for an air flow between the at least one inner air guide and the respective end-winding.

2. The electrical generator as claimed in claim 1, further comprising: at least one outer air guide provided outside the plurality of end-windings.

3. The electrical generator as claimed in claim 2, wherein an outer distance is provided between the at least one outer air guide and the end-windings.

4. The electrical generator as claimed in claim 3, wherein the at least one outer air guide is fixed to a rotor of the electric generator.

5. The electrical generator as claimed in claim 4, wherein one outer air guide is provided for all the end-windings at the first axial end or at the second axial end.

6. The electrical generator as claimed in claim 3, wherein the at least one outer air guide is fixed to the stator of the electric generator.

7. The electrical generator as claimed in claim 1, wherein air flow provides cooling.

8. The electrical generator as claimed in claim 1, wherein one respective inner air guide is provided for each respective end-winding of the plurality of end-windings.

9. The electrical generator as claimed in claim 1, wherein the windings are concentrated windings, each end-winding connecting the windings in two circumferentially adjacent slots.

10. A wind turbine comprising:
an electrical generator including a stator having a stator body extending axially between a first axial end and a second axial end, the stator body including a plurality of slots, the plurality of slots being circumferentially distributed around a longitudinal axis of the stator body,
the stator including a plurality of windings housed in the plurality of slots and a plurality of end-windings, each end-winding having a curved shape and connecting the windings in two slots of said plurality of slots, and
at least one inner air guide located at an inside of at least one end-winding of the plurality of end-windings, the inside of the at least one end-winding being a volume between the at least one end-winding and the stator,
wherein the at least one inner air guide protrudes from the stator body of the stator along the longitudinal axis,
wherein an inner distance is provided between a distal end of the at least one inner air guide in the direction of the longitudinal axis and the respective end-winding, the inner distance allowing for an air flow between the at least one inner air guide and the respective end-winding.

11. A generator comprising:
a stator having a stator body extending axially between a first axial end and a second axial end, the stator body including a plurality of slots, the plurality of slots being circumferentially distributed around a longitudinal axis of the stator body,
the stator including a plurality of windings housed in the plurality of slots and a plurality of end-windings, each end-winding of the plurality of end-windings having a curved shape and connecting the windings in two slots of said plurality of slots, wherein the plurality of windings are concentrated windings and each end-winding of the plurality of end-windings connects respective windings in two circumferentially adjacent slots of the plurality of slots, and
at least one inner air guide located at an inside of at least one end-winding of the plurality of end-windings, the inside of the at least one end-winding being a volume between the at least one end-winding and the stator,
wherein the at least one inner air guide protrudes from the stator body of the stator along the longitudinal axis,
wherein an inner distance is provided between a distal end of the at least one inner air guide in the direction of the longitudinal axis and the respective end-winding, the inner distance allowing for an air flow between the at least one inner air guide and the respective end-winding.

* * * * *